March 24, 1931.  J. GIET  1,797,860
TIRE SPREADER
Filed Feb. 11, 1930
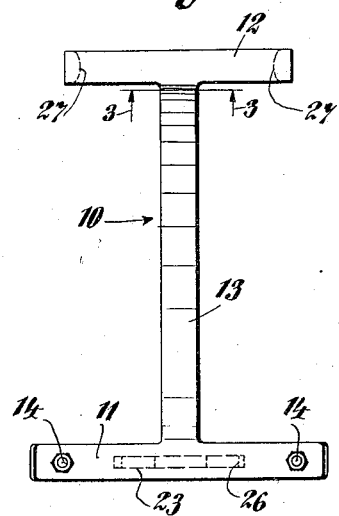
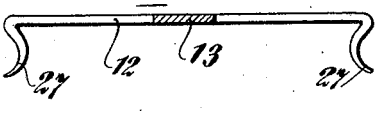
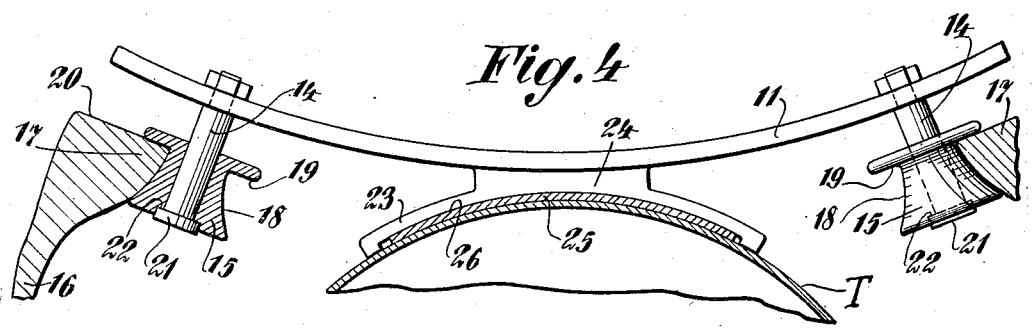
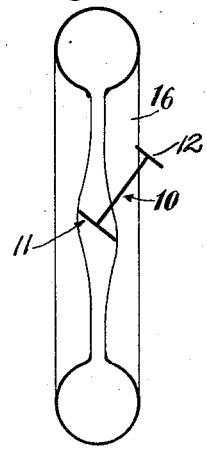
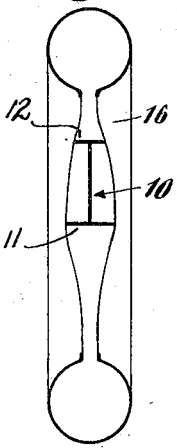
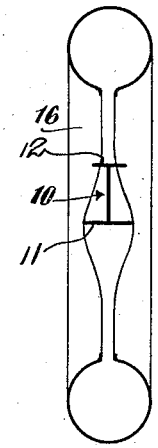
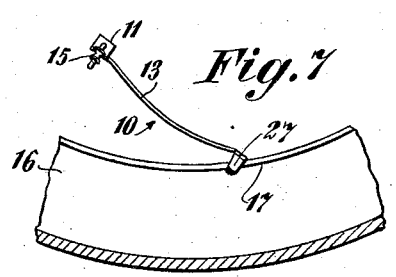

Patented Mar. 24, 1931

1,797,860

UNITED STATES PATENT OFFICE

JOHN GIET, OF LONG ISLAND CITY, NEW YORK

TIRE SPREADER

Application filed February 11, 1930. Serial No. 427,485.

This invention relates to tire spreaders, which are used to facilitate the insertion of a pneumatic tube into the tire.

One object of the invention is to provide a device of the character described, having improved means to spread a tire casing and to retain the same spread while the pneumatic tube is being passed beneath the tool for insertion into the tire casing.

Another object of the invention is the provision of a device of the nature set forth having improved means for actuating the pneumatic tube into the tire casing and guiding the insertion thereof.

Another object of the invention is to furnish an improved tire casing spreader arranged to actuate a pneumatic tube thereinto and having the means for engaging the tire casing adjustable to suit casings of various sizes.

Another object of the invention is to furnish a tire spreader having improved means for positioning the filler strip.

Further objects of the invention are to provide a simple and inexpensive tire spreading tool, having few parts, which is reliable and rugged, and efficient in use to a high degree.

According to the practice heretofore known, it has been customary to insert a pneumatic tube in fully deflated condition into a tire casing. In this condition, and because of the delicate structure of the tube, any bend or twist thereon would damage the tube and cause an eventual break. Even where tire spreader tools have been used, the tube had to be substantially fully deflated for insertion. By my invention the pneumatic tube may be partially inflated, whereby the wall thereof is kept uniform and breaking avoided.

In order to prevent damage to the pneumatic tube by any foreign object or any irregularity in the internal wall of the tire casing, the latter must be carefully inspected. By this invention, the inspection may be accomplished at the same time that the pneumatic tube is inserted into the casing.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein the like parts are designed by the same reference characters throughout the several views.

In the drawing:

Figure 1 is a top plan view of a tire casing spreader embodying the invention.

Fig. 2 is a side edge view of the same.

Fig. 3 is an enlarged sectional view taken on line 3—3 of Fig. 1.

Fig. 4 is an enlarged end view of the tire spreader showing the same in operating position.

Fig. 5 is a diagrammatic view showing the initial step in applying the tool to a tire casing.

Fig. 6 is a similar view showing the next step, with the tool engaging the casing at a plurality of circumferentially spaced points.

Fig. 7 is a side edge view showing the third step, in which one end of the tool is raised out of engagement with the tire casing to permit insertion of a pneumatic tube thereunder and into the tire casing.

Fig. 8 is a diagrammatic view showing the previously raised end of the tool re-engaged in the casing, and the other end disengaged for running the tube into the casing.

Generally described, the invention provides a tire casing spreader having a plurality of spaced spreader ends which may be of any desired relative size or shape, and are utilized for spreading the casing at a plurality of circumferentially spaced points. These spreader portions may be operatively engaged with the casing successively or simultaneously, as desired. They may be interconnected in any suitable manner, for example, rigidly. One of the spreader portions may be first engaged with the casing to spread the same by a pivotal movement of the tool. Then the second spreader portion, which may be smaller in size than the first is inserted into the casing. Thereafter the first spreader portion is moved out of the casing, and the tube inserted into the casing which is held spread by the second mentioned portion of the tool. When a part of the tube has been received in the casing, the first spreader portion is re-engaged in the spreading position in the casing and the first portion disengaged. Now the tool may be moved circumferentially around the casing to run the tube into the same. The second spreader portion may at this time act as a handle for the tool. The latter has a curved guide member extending into the casing to actuate and guide the tube, the filler strip, or both, into proper position. In running the tool around the casing, the anti-friction means, as, for instance, rollers engage the beads of the casing, and these rollers may be mounted for axial movement to automatically adjust themselves to the size of the casing.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention. The same includes a tool comprising a main spreader 11, an auxiliary spreader 12, and an interconnecting shank 13. The tool can be made of any desired material, as an integral stamping, or casting, or of interconnected parts which permit an inexpensive construction.

The main spreader 11 may be in the nature of an elongated member, carrying at the ends thereof the pins or stub shafts 14. On the latter may be journaled a plurality of rollers 15 to extend inwardly into a tire casing 16 for engaging the beads 17 thereof. The rollers may be grooved at 18 to conform to the shape of the beads, and a wall 19 of the grooves may lie along a plane substantially at right angles to the axes of the rollers for a reliable riding and bearing action on the outside surfaces 20 of the beads.

To provide for axial movement of the rollers for adjustability to tire casings of various sizes, and particularly for a co-ordination with other tool parts hereinafter described, the pins 14 are of the required length as shown. The ends of the pins may be headed at 21, the heads being receivable in countersinks 22 of the rollers.

The shape of the main spreader 11 may be made to suit, and it may be so formed that the pins 14 extend at an angle to each other, for improved holding coaction of the casing beads 17 with the rollers 15. Thus the member 11 may be curved with its convex side toward the adjacent part of the casing 16.

Extending inward into the tire casing is an actuating and guide member 23 for pressing the pneumatic tube T into the tire casing and accurately centrally guiding the former. This actuating and guiding co-operating may be variously accomplished, as, for example, by curving the member 23 to conform to the shape of the pneumatic tube. The member 23 may be rigidly connected to the main spreader 11 by a portion 24, and said member can be of any desired width, or narrower than the main spreader.

To guide a fabric or other flap 25 along the tube, which flap is used to protect the pneumatic tube at the beads of the tire casing, the member 23 may be suitably formed to receive the same, by means of a slot, or recess 26 formed in the under side of the member.

The auxiliary spreader member 12 may be straight or of any other suitable shape. At its ends are engagement means 27 to engage the beads 17 of the tire casing. The means 27 may be in the form of opposed hooks. The opening in the hooks is preferably considerably larger than the beads received thereby.

Interconnecting the main and auxiliary spreaders 11 and 12 is the shank 13 which may be variously positioned with reference to the center line of the tool. By centrally locating the shank, a strong and inexpensive casting may be obtained, and the member 12 may constitute a convenient handle. The shank may be curved longitudinally, toward the adjacent part of the tire casing.

The operation of the device will now be clearly apparent. The main spreader 11 is inserted angularly between the beads 17 of the tire casing as in Figure 5 and the tool is then pivotally turned until the center line of the tool lies in the plane of the tire casing as in Fig. 6. In the latter positon, the auxiliary spreader 12 is engaged with the beads. Now the main spreader is released and raised as in Fig. 7, and the pneumatic tube inserted beneath the main spreader and into the casing. Thereafter the main spreader 11 is re-engaged with the beads of the casing, and the auxiliary spreader 12 released therefrom. In this position, the member 12 acts as a handle whereby the tool may be drawn around the tire casing with the rollers running along the beads. Simultaneously, the tube and the flap are placed in position.

I claim:

1. A tire casing spreading tool including a plurality of rollers adapted to engage opposite edge portions of the tire casing, a bar for mounting said rollers, said bar being adapted to extend transversely of the tire casing, a second bar connected at one end to the center of the first bar and adapted to extend along the tire casing, and a third bar connected at its central portion to the other end of the second bar, said third bar having elements for engaging opposite edge portions of the tire casing, the distance between said elements being less than the distance between said rollers, the portion of the third bar intermediate of said elements constituting a handle for running the tool along the casing.

2. A tire casing spreading tool including a main spreader, said main spreader having a plurality of rollers for engaging opposite edge portions of the tire casing, and an auxiliary tire spreader connected to the main spreader and including a plurality of elements for engaging opposite edge portions of the tire casing, the distance between said elements being less than the distance between said rollers, said elements being disposed substantially parallel to a diameter of the tire casing, and said rollers having their axes diverging toward the tread of the tire casing.

In testimony whereof I affix my signature.

JOHN GIET.